US010991227B2

(12) United States Patent
Stern et al.

(10) Patent No.: US 10,991,227 B2
(45) Date of Patent: *Apr. 27, 2021

(54) SYSTEMS AND METHODS FOR PROVIDING EVENT NOTIFICATIONS

(71) Applicant: Time Warner Cable Enterprises LLC, St. Louis, MO (US)

(72) Inventors: Peter Stern, Greenwich, CT (US); Scott Ramsdell, Charlotte, NC (US); Adam Mayer, New York, NY (US); Mike Roudi, Plano, TX (US); Chris Williams, Chantilly, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,090

(22) Filed: Apr. 22, 2019

(65) Prior Publication Data
US 2019/0318604 A1    Oct. 17, 2019

Related U.S. Application Data

(62) Division of application No. 15/295,810, filed on Oct. 17, 2016, now Pat. No. 10,269,229, which is a (Continued)

(51) Int. Cl.
*G08B 1/08* (2006.01)
*G08B 21/10* (2006.01)
(Continued)

(52) U.S. Cl.
CPC ........... *G08B 21/10* (2013.01); *G08B 27/005* (2013.01); *G08B 27/006* (2013.01);
(Continued)

(58) Field of Classification Search
CPC .... G08B 21/10; G08B 27/005; G08B 27/006; G08B 27/008; H04W 4/90; H04N 21/43615; H04N 21/454; H04N 21/4882
See application file for complete search history.

(56) References Cited

U.S. PATENT DOCUMENTS 3,993,955 A    11/1976 Belcher et al.
5,327,176 A    7/1994  Forler et al.
(Continued)

OTHER PUBLICATIONS

Saint-Andre, Peter and Fletcher, Boyd XEP-0127: Common Alerting Protocol (CAP) Over XMPP Last Updated Dec. 9, 2004.

*Primary Examiner* — Phung Nguyen
(74) *Attorney, Agent, or Firm* — Gazdzinski & Associates, PC

(57) ABSTRACT

Methods and apparatus for providing indications of received emergency alert messages to devices within a consumer premises are disclosed. In one embodiment, a consumer premise equipment (CPE) receiving one or more emergency alert messages from a content provider or managed network determines one or more alert responses for one or more devices of the consumer premise network. In one implementation, the responses are based at least in part on the received emergency alert messages themselves. The CPE issues one or more commands to one or more devices present within the consumer premises (which may be for example a home automation system), to indicate the one or more determined alert indication responses, such as auditory alert and visual alert by the one or more devices. Thus, users in the consumer premises may be made aware of an alert message outside of the typical means in which an alert is displayed, such as via a television.

26 Claims, 9 Drawing Sheets

Related U.S. Application Data division of application No. 14/059,273, filed on Oct. 21, 2013, now Pat. No. 9,472,091.

(51) Int. Cl.

| | | |
|---|---|---|
| *G08B 27/00* | (2006.01) | |
| *H04N 21/488* | (2011.01) | |
| *H04N 21/436* | (2011.01) | |
| *H04N 21/454* | (2011.01) | |
| *H04W 4/90* | (2018.01) | |
| *H04N 21/485* | (2011.01) | |

(52) U.S. Cl.

CPC ..... *G08B 27/008* (2013.01); *H04N 21/43615* (2013.01); *H04N 21/454* (2013.01); *H04N 21/4882* (2013.01); *H04W 4/90* (2018.02); *H04N 21/485* (2013.01)

(56) References Cited

U.S. PATENT DOCUMENTS

| | | | |
|---|---|---|---|
| 5,714,534 A | 2/1998 | Kojima et al. | |
| 5,790,842 A | 8/1998 | Charles et al. | |
| 5,948,040 A | 9/1999 | Delorme et al. | |
| 6,061,056 A | 5/2000 | Menard et al. | |
| 6,240,555 B1 | 5/2001 | Shoff et al. | |
| 6,256,072 B1 | 7/2001 | Bae et al. | |
| 6,452,492 B1 | 9/2002 | Drury | |
| 6,513,003 B1 | 1/2003 | Angell et al. | |
| 6,564,383 B1 | 5/2003 | Combs et al. | |
| 6,587,153 B1 | 7/2003 | Unemura | |
| 6,615,175 B1 | 9/2003 | Gazdzinski | |
| 6,674,767 B1 | 1/2004 | Kadyk et al. | |
| 6,714,534 B1 | 3/2004 | Gerszberg et al. | |
| 6,766,163 B1 | 7/2004 | Sharma | |
| 6,771,302 B1 | 8/2004 | Nimri et al. | |
| 6,772,435 B1 | 8/2004 | Thexton et al. | |
| 6,792,616 B1 | 9/2004 | Jerding et al. | |
| 6,903,779 B2 | 6/2005 | Dyer | |
| 6,928,656 B1 | 8/2005 | Addington | |
| 7,009,657 B2 | 3/2006 | Mitts et al. | |
| 7,035,804 B2 | 4/2006 | Saindon et al. | |
| 7,102,688 B2 | 9/2006 | Hayes et al. | |
| 7,114,169 B1 | 9/2006 | Kahn | |
| 7,119,675 B2 | 10/2006 | Khandelwal et al. | |
| 7,126,454 B2 | 10/2006 | Bulmer | |
| 7,130,790 B1 | 10/2006 | Flanagan et al. | |
| 7,139,032 B2 | 11/2006 | Unemura | |
| 7,142,892 B2 | 11/2006 | Dennis et al. | |
| 7,159,230 B2 | 1/2007 | Manson et al. | |
| 7,296,074 B2 | 11/2007 | Jagels | |
| 7,324,003 B2 | 1/2008 | Yun et al. | |
| 7,336,942 B2 | 2/2008 | Wang | |
| 7,592,912 B2 | 9/2009 | Hasek et al. | |
| 7,936,254 B2 | 5/2011 | McClenny et al. | |
| 8,073,903 B2 | 12/2011 | Wood et al. | |
| 8,095,610 B2 | 1/2012 | Gould et al. | |
| 8,239,545 B2 | 8/2012 | Lee et al. | |
| 8,438,221 B2 | 5/2013 | Wood et al. | |
| 8,519,860 B2 | 8/2013 | Johnson et al. | |
| 8,653,963 B2 | 2/2014 | Vallaire | |
| 9,414,111 B2 | 8/2016 | Hasek et al. | |
| 2002/0015106 A1 | 2/2002 | Taylor et al. | |
| 2002/0038460 A1 | 3/2002 | Kimoto | |
| 2002/0049980 A1 | 4/2002 | Hoang | |
| 2002/0080038 A1 | 6/2002 | Smith et al. | |
| 2002/0107032 A1 | 8/2002 | Agness et al. | |
| 2002/0140863 A1 | 10/2002 | Park | |
| 2002/0147984 A1 | 10/2002 | Tomsen et al. | |
| 2002/0171760 A1 | 11/2002 | Dyer | |
| 2002/0194592 A1 | 12/2002 | Tsuchida et al. | |
| 2003/0121036 A1 | 6/2003 | Lock et al. | |
| 2003/0169182 A1 | 9/2003 | Wilhelm et al. | |
| 2003/0182429 A1 | 9/2003 | Jagels | |
| 2003/0182620 A1 | 9/2003 | Errico et al. | |
| 2003/0206549 A1 | 11/2003 | Mody et al. | |
| 2003/0216133 A1 | 11/2003 | Poltorak | |
| 2003/0217365 A1 | 11/2003 | Caputo | |
| 2003/0219104 A1 | 11/2003 | Malik | |
| 2003/0227976 A1 | 12/2003 | Okada et al. | |
| 2004/0042479 A1 | 3/2004 | Epstein et al. | |
| 2004/0117843 A1 | 6/2004 | Karaoguz et al. | |
| 2004/0136698 A1 | 7/2004 | Mock | |
| 2004/0158870 A1 | 8/2004 | Paxton et al. | |
| 2004/0181811 A1 | 9/2004 | Rakib | |
| 2004/0249944 A1 | 12/2004 | Hosking et al. | |
| 2004/0257440 A1 | 12/2004 | Kondo et al. | |
| 2005/0015799 A1 | 1/2005 | Park | |
| 2005/0151639 A1 | 7/2005 | Bulmer | |
| 2005/0162267 A1* | 7/2005 | Khandelwal | G08B 27/008 340/506 |
| 2005/0188411 A1 | 8/2005 | Dacosta | |
| 2005/0198684 A1 | 9/2005 | Stone et al. | |
| 2005/0210511 A1 | 9/2005 | Pettinato | |
| 2005/0246758 A1 | 11/2005 | Khandelwal et al. | |
| 2006/0015915 A1 | 1/2006 | Yun | |
| 2006/0040639 A1 | 2/2006 | Karl et al. | |
| 2006/0055527 A1 | 3/2006 | Pugel et al. | |
| 2006/0156343 A1 | 7/2006 | Jordan | |
| 2006/0161946 A1* | 7/2006 | Shin | H04L 12/2827 725/33 |
| 2006/0174106 A1 | 8/2006 | Bell et al. | |
| 2007/0004377 A1 | 1/2007 | Medford et al. | |
| 2007/0033531 A1 | 2/2007 | Marsh | |
| 2007/0136743 A1 | 6/2007 | Hasek et al. | |
| 2007/0136777 A1 | 6/2007 | Hasek et al. | |
| 2007/0207771 A1* | 9/2007 | Bowser | G08B 27/005 455/404.1 |
| 2007/0226762 A1 | 9/2007 | Girgis et al. | |
| 2008/0216113 A1 | 9/2008 | Yun et al. | |
| 2009/0128323 A1 | 5/2009 | Milbar et al. | |
| 2010/0027769 A1 | 2/2010 | Stevens et al. | |
| 2010/0135205 A1 | 6/2010 | Li et al. | |
| 2010/0211793 A1 | 8/2010 | Park et al. | |
| 2011/0130112 A1* | 6/2011 | Saigh | H04M 1/7253 455/404.1 |
| 2012/0122428 A1 | 5/2012 | Stephens, Jr. | |
| 2012/0172062 A1 | 7/2012 | Altman et al. | |
| 2013/0298157 A1* | 11/2013 | Amsterdam | H04N 21/23418 725/33 |
| 2014/0282704 A1* | 9/2014 | Tumuluru | H04N 21/4882 725/33 |
| 2014/0354442 A1* | 12/2014 | Maity | G08B 27/005 340/691.6 |
| 2018/0351665 A1 | 12/2018 | Fukuta | |
| 2018/0375887 A1 | 12/2018 | Dezent | |

* cited by examiner

SYSTEMS AND METHODS FOR PROVIDING EVENT NOTIFICATIONS

PRIORITY AND RELATED APPLICATIONS

This application is a divisional of and claims priority to co-owned and co-pending U.S. patent application Ser. No. 15/295,810 of the same title filed on Oct. 17, 2016, issuing as U.S. Pat. No. 10,269,229 on Apr. 23, 2019, which is a divisional of and claims priority to co-owned U.S. patent application Ser. No. 14/059,273 entitled "SYSTEMS AND METHODS FOR PROVIDING EMERGENCY ALERTS" filed on Oct. 21, 2013, and issued as U.S. Pat. No. 9,472,091 on Oct. 18, 2016, each of which are incorporated herein by reference in its entirety. Additionally, this application is related to co-pending U.S. patent application Ser. No. 11/299,169 filed Dec. 9, 2005 and entitled "EMERGENCY ALERT DATA DELIVERY APPARATUS AND METHODS", which issued as U.S. Pat. No. 7,592,912 on Sep. 22, 2009, and U.S. patent application Ser. No. 12/079,781 filed Mar. 28, 2008 and entitled "METHODS AND APPARATUS FOR CENTRALIZED AND DECENTRALIZED EMERGENCY ALERT MESSAGING", which issued as U.S. Pat. No. 8,095,610 on Jan. 10, 2012, each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field of the Disclosure

The present disclosure relates generally to the field of delivery of digital media data (e.g., text, video, and/or audio) over networks such as the Internet, and specifically in one aspect to delivering emergency alert system (EAS) data in a network to provide alert indications to devices resident within consumer premises.

2. Description of Related Technology

Emergency Alert System (EAS)—

As is well known, the Emergency Alert System (EAS) is designed to allow for the rapid and widespread dissemination of information relating to a national or local emergency to the general public. EAS messages are transmitted for either national, state or local emergencies or other events. Examples of these emergencies or events include: severe weather watch/storm warning, flash floods, earthquakes/tsunami, and war or other "man made" emergencies.

The EAS was designed in part by the Federal Communications Commission (FCC) in cooperation with the National Weather Service (NWS) and the Federal Emergency Management Agency (FEMA), in order to support the roles of each organization. The FCC provides information to broadcasters, cable system operators, and other participants in the EAS regarding the technical and operational requirements of the EAS. Additionally, the FCC ensures that state and local EAS plans conform to FCC rules and regulations. The NWS provides emergency weather information to alert the public about potential and/or dangerous weather conditions, or other natural events. FEMA provides direction for state and local emergency planning officials to plan and implement their roles in the EAS.

Alerts sent via the EAS may arrive in the form of text, audio and/or video content. Depending on the message type, the subscriber's television or set-top box (STB) will display the message in the appropriate format and according to the prescribed method. State and Local area emergency messages may be transmitted by using EAS Header and End of Message Codes. In television environments, the FCC recommends that the codes be preceded by an announcement that informs listeners that an EAS transmission will occur.

In current digital and analog television systems, the EAS transmissions are received from an over-the-air broadcast. The transmission is then used in two different ways.

First, for analog broadcasts, all of the analog channels are either force-tuned to a broadcast of the EAS transmission or create the appropriate overlay of text and audio. Nothing is required at the subscriber (e.g., set-top box) side since all switching and display functionality is performed in the network head-end.

Second, for digital broadcasts, the digital head-end application server receives the transmission and creates the proper audio, video and/or text message for the digital set-top box (DSTB) or other consumer premises equipment. The DSTB is then responsible for displaying the message to the user as prescribed by the government mandate. If the EAS transmission is video, then the DSTB will "forcibly" tune its tuner to the appropriate analog RF channel to receive, decode and display the video.

Testing of the EAS system generally comprises a weekly test consisting of an eight-second digital data signal. There is also a monthly test that utilizes a test script (e.g., "This is a test of the Emergency Alert System—this is only a test . . . ."). The monthly test script may be developed locally and may contain information that is relevant to the local area into which it is being delivered.

Other features of the digital EAS systems include:

(i) Automatic Operation—The EAS digital system architecture allows broadcast stations, cable systems, participating satellite companies, and other services to send and receive emergency information quickly and automatically even if those facilities are unattended;

(ii) Redundancy—The EAS requires monitoring of at least two independent sources for emergency information. This insures that emergency information is received and delivered to viewers and listeners; and (iii) Multi-language—EAS digital messages can be automatically converted into any language used by the broadcast station or cable system.

"IPTV" and Other Network Paradigms—

Network operators use other types of networks such as Internet protocol (IP) networks to distribute broadcast television programming to subscribers. This is to be contrasted with more traditional radio frequency (over-the-air) broadcasts, or in-band delivery via packetized MPEG-2 program streams. Such IP delivery of broadcast television programming also requires a method for the delivery of EAS data to subscriber units such as personal computers (PC), as well as a method to display such information on the display monitor (and audio system) of these units.

In Internet protocol television (IPTV) and similar distribution networks, a wider choice of audio/video codecs is being considered. For example, MPEG-2, MPEG-4/H.264 (advanced video codec or "AVC"), are a few of the possible audio/video compression formats that have been deployed. While these new formats and their associated compression technology is useful in providing streaming audio/video programs to end users, these formats do not typically support any type of EAS data delivery. While some video codecs have the ability to embed caption or similar information within the video stream (MPEG-2/MPEG-4, etc.), many video codecs do not. Accordingly, the ability to transport at least some of the EAS information to the displaying client outside of the content (e.g., video) packet streams would be of particular utility.

Other Emergency Alert Approaches—

A variety of other approaches to emergency alert transmission over a network (and display be user devices) are evidenced in the prior art. See for example, U.S. Pat. No. 3,993,955 to Belcher, et al. issued Nov. 23, 1976 entitled "METHOD AND APPARATUS FOR ESTABLISHING EMERGENCY COMMUNICATIONS IN A TWO-WAY CABLE TELEVISION SYSTEM", U.S. Pat. No. 6,240,555 issued May 29, 2001 to Shoff, et al entitled "INTERACTIVE ENTERTAINMENT SYSTEM FOR PRESENTING SUPPLEMENTAL INTERACTIVE CONTENT TOGETHER WITH CONTINUOUS VIDEO PROGRAMS", U.S. Pat. No. 6,452,492 to Drury issued on Sep. 17, 2002 entitled "EMERGENCY ALERT SYSTEM", U.S. Pat. No. 6,714,534 to Gerszberg, et al. issued Mar. 30, 2004 entitled "LIFELINE SERVICE FOR HFCLA NETWORK USING WIRELESS ISD", U.S. Pat. No. 6,766,163 issued Jul. 20, 2004 to Sharma entitled "METHOD AND SYSTEM OF DISPLAYING TELETEXT INFORMATION ON MOBILE DEVICES", U.S. Pat. No. 6,771,302 issued Aug. 3, 2004 to Nimri, et al entitled "VIDEOCONFERENCE CLOSED CAPTION SYSTEM AND METHOD", U.S. Pat. No. 6,792,616 issued Sep. 14, 2004 entitled "SYSTEM AND METHOD FOR PROVIDING A PLURALITY OF PROGRAMMING SERVICES IN A TELEVISION SYSTEM", U.S. Pat. No. 6,903,779 issued Jun. 7, 2005 to Dyer entitled "METHOD AND SYSTEM FOR DISPLAYING RELATED COMPONENTS OF A MEDIA STREAM THAT HAS BEEN TRANSMITTED OVER A COMPUTER NETWORK", U.S. Patent Application No. 20030121036 to Lock, et al. published on Jun. 26, 2003 entitled "CATV MESSAGING ALERT SYSTEM", U.S. Patent Publication No. 20040181811 to Rakib published on Sep. 16, 2004 entitled "THIN DOCSIS IN-BAND MANAGEMENT FOR INTERACTIVE HFC SERVICE DELIVERY", U.S. Patent Publication No. 20050015799 to Park published Jan. 20, 2005 entitled "APPARATUS AND METHOD FOR DISPLAYING OUT-OF-BAND (OOB) CHANNEL INFORMATION IN OPEN CABLE SYSTEM", U.S. Patent Publication No. 20050151639 to Bulmer published Jul. 14, 2005 entitled "ALERT SYSTEM", U.S. Patent Publication No. 20050162267 to Khandelwal, et al. published on Jul. 28, 2005 and entitled "EMERGENCY ALERT SERVICE", and U.S. Patent Publication No. 20050198684 to Stone, et al. published Sep. 8, 2005 entitled "METHOD AND APPARATUS FOR PROVIDING A DSG TO AN OOB TRANSCODER".

"Digicable" is another prior art system supplied by General Instrument (Motorola) for end-to-end satellite and cable system distribution networks. It uses an out-of-band data channel to deliver common system information associated with all in-band channels. Out-of-band traffic in these systems included: Entitlement Management Messages (EMM) addressed to individual STBs and carrying conditional access secure authorization instructions for requested services; Service Information that supports the STB navigation application with information about the requested service; program guide information to display what is on the various channels at various times; an Emergency Alert System messages to cause the STB to display a text message, play an audio message or force tuning to an alert channel.

Additional technological advancements have lead to the proliferation of home management systems. Such systems employ communications technologies (such as wireless and Internet communication) to provide remote access and control to a user's home security and automation systems. In this manner, information relating to connected devices may be transmitted wirelessly to a user's mobile telephone. For example, home security data may be collected from security apparatus (such as cameras, sensors, etc.) and provided to a user. Additionally, the foregoing technologies may be used to enable a user to control various appliances at the user's home remotely (via the mobile device). For example, the user may turn on/off lights, air conditioning, and other appliances.

From the foregoing, it is clear that while the prior art has generally recognized the need to receive and provide EAS data to client devices over analog networks, and to enable EAS decode and display capability compatible with an audio/video decoder on a client device, it fails to provide adequate alerting in circumstances in which a user may be unaware of the EAS message. For example, the user may not be in a close enough proximity to be made aware of the EAS message, or the responsible display device is not powered on. Accordingly, the user may be at an increased risk of injury and or loss due to the lack of being informed of the emergency.

Accordingly, what are needed are apparatus and methods that provide a mechanism for robustly alerting users of a received EAS message. Such apparatus and methods should preferably be able to provide emergency indications to a variety of consumer premises and mobile devices, and in a comprehensive manner. Lastly, these methods and apparatus would in certain implementations require only minimal changes to existing systems, thereby leveraging the installed infrastructure as much as possible.

SUMMARY OF THE DISCLOSURE

The present disclosure addresses the foregoing needs by providing, inter alia, methods and apparatus for providing indications of emergency messages received via a network infrastructure to devices within a consumer premises network.

In one aspect, a method for providing indications of emergency alerts to a device in a consumer premises network is disclosed. In one embodiment, the method includes: receiving one or more emergency alert messages, determining one or more alert indication responses for one or more devices of the consumer premise network based at least in part on the one or more emergency alert messages, and issuing one or more commands to the one or more devices to implement the one or more determined alert indication responses.

In a second aspect, an apparatus configured for use in a consumer premise network is disclosed. In one embodiment, the apparatus includes a processor, one or more interfaces in data communication with the processor, and a non-transitory computer readable storage medium with at least one computer program stored thereon. In one embodiment, the at least one computer program is configured to, when executed, cause the apparatus to receive an emergency alert system (EAS) message, reformat the received EAS message into one or more indication alert messages, and transmit the one or more indication alert messages to one or more devices in communication with the consumer premise network.

In one variant, the one or more indication alert messages lack message content of the EAS message itself.

In a second variant, the one or more indication alert messages are configured to activate one or more functionalities of the one or more devices, the activated one or more functionalities being related to at least one aspect of the emergency reflected in the received EAS message.

In a third aspect, a method for displaying indications of an emergency by a device in a consumer premises network is disclosed. In one embodiment, the method includes receiving one or more alert commands, the one or more alert commands indicative of an emergency alert message received at the consumer premises network, and performing one or more notification tasks based at least in part on the received one or more alert commands.

These and other aspects of the disclosure shall become apparent when considered in light of the disclosure provided herein.

Figure 1:
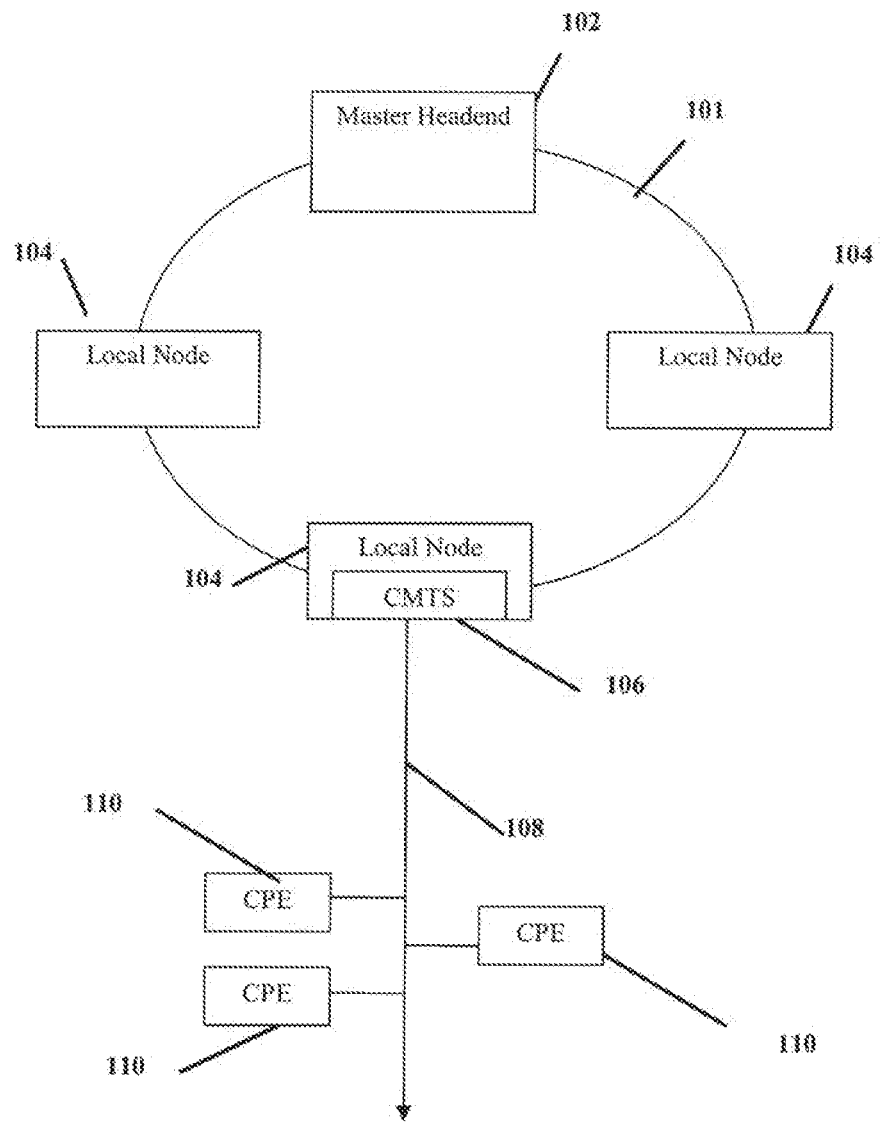
FIG. 1 is a functional block diagram illustrating an exemplary content delivery (e.g., cable) network configuration useful with the present disclosure.

All figures © Copyright 2013 Time Warner Cable, Inc. All rights reserved.

DETAILED DESCRIPTION OF THE DISCLOSURE

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones.

As used herein, the terms "closed captioning" "caption data" or "CC data" are used to refer to, without limitation, the transcription of audio programs, as well as extended data services and VBI data/test signals, and delivering information such as metadata associated with a television program (including inter alia providing URLs for selective advertising, Really Simple Syndication (RSS) feed information related to video programs, news clips, stock, weather data, etc.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (Real-Video, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or user's premises and connected to or in communication with a network.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "display" means any type of device adapted to display information, including without limitation CRTs, LCDs, TFTs, plasma displays, LEDs, incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0.

As used herein, the terms "emergency alert system (EAS)", "alert data", "emergency alert (EA)", and "emergency broadcast system" refer to, without limitation, the generation and/or delivery of text, audio, and/or visual or video information relating to events, alerts or emergency situations.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), Zigbee®, Z-wave, PAN (e.g., 802.15), power line carrier (PLC), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one aspect of the disclosure, methods and apparatus for providing indications of received emergency alert messages to devices within a consumer premises are disclosed. A consumer premise equipment (CPE) receiving one or more emergency alert messages from a content provider determines one or more alert indication responses for one or more devices of the consumer premise network based at least in part on the received emergency alert messages. The CPE issues one or more commands to one or more devices present within the consumer premise to indicate the one or more determined alert indication responses, such as auditory alert and visual alert by the one or more devices. Thus, users in the consumer premise may be made aware of an alert message outside of the typical means in which an alert is display, such as via a television.

In one embodiment, the CPE communicates with a home automation system of the consumer premise network. The home automation system is configured to receive the one or more commands which may be configured to directly request desired alert responses or may provide indications of a received alert message for the home automation system to determine a desired alert response. By using the home automation system, devices under the control of the home automation system may be leveraged to increase the effectiveness in which a user may be notified of received emergency alert messages.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned DOCSIS hybrid fiber coax (HFC) cable architecture, the general principles and advantages of the disclosure may be extended to other types of networks and architectures where delivery of emergency information or data is required or desirable. Such other networks or architectures may be broadband, narrowband, wired or wireless, content or data, or otherwise. Hence, the following description is merely exemplary in nature. For example, the disclosure may be practiced over a fiber-to-the-home (FTTH) or fiber-to-the-curb (FTTC) system or over future satellite or millimeter wave-based network having two-way capabilities similar to today's digital cable HFC networks.

It will also be appreciated that while described generally in the context of a network providing service to a customer or consumer (i.e., residential) end user domain, the present disclosure may be readily adapted to other types of environments including, e.g., commercial/enterprise, and government/military applications. Myriad other applications are possible.

Network-Side Architecture—

Referring now to FIG. 1, an exemplary data-over-cable (DOCSIS) network 100, including broadcast IPTV service, is shown. For clarity of illustration, some details of the network not pertinent to the present disclosure have been omitted from FIG. 1. A "master" head-end 102 is connected with one or more local nodes 104 via a network 100. The network 100 could for example comprise an optical fiber network of the type known in the art using dense wave-division multiplexing (DWDM), Synchronous Optical Network (SONET) transport technology or gigabit Ethernet transport. In the downstream direction (from the head-end servers or nodes to the CPE 110), this network performs the function of carrying digital and analog television signals as well as packetized data (e.g., IP) traffic. A cable modem termination system (CMTS) 106 located at a local node 104 provides connectivity to the CPE 110 via the coaxial drop 108. The CMTS interfaces 106 in turn are connected directly or indirectly to the Internet or IP backbone, thereby providing access for the CPE 110 to the Internet (or other internets, intranets, or networks) via the cable network infrastructure. Aggregation of television programs that include local and regional programming, or other types of content, occurs at the head-end 102, where these programs are converted into a suitable transport format and a "channel line-up" is created for delivery to the downstream CPE 110.

Figure 1A:
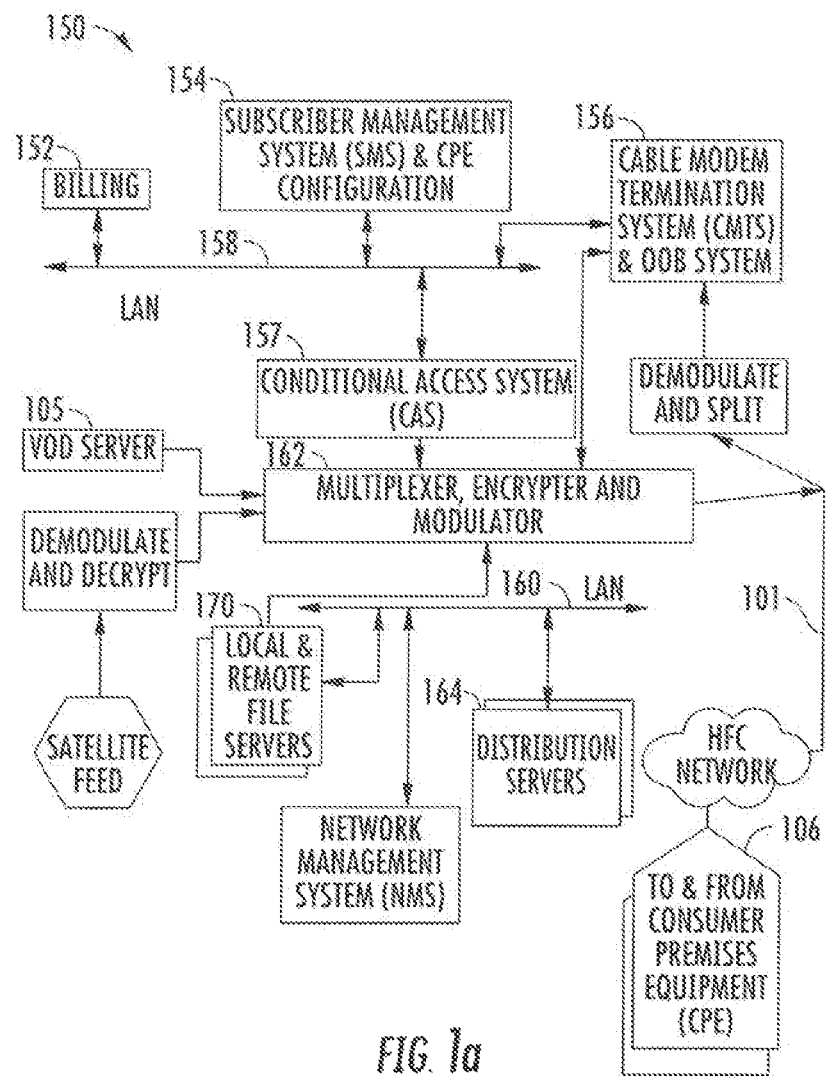
FIG. 1a is a functional block diagram illustrating one exemplary HFC cable network head-end configuration useful with the present disclosure.

Referring now to FIG. 1a, one exemplary embodiment of a head-end architecture useful with various aspects of the present disclosure is described. As shown in FIG. 1a, the head-end architecture 150 comprises typical head-end components and services including billing module 152, subscriber management system (SMS) and CPE configuration management module 154, and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. The head-end architecture 150 may also include a cable-modem termination system (CMTS) if desired.

It will also be appreciated that the head-end configuration depicted in FIG. 1a is high-level, conceptual architecture, and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the disclosure is in no way limited to these exemplary approaches.

Figure 2:
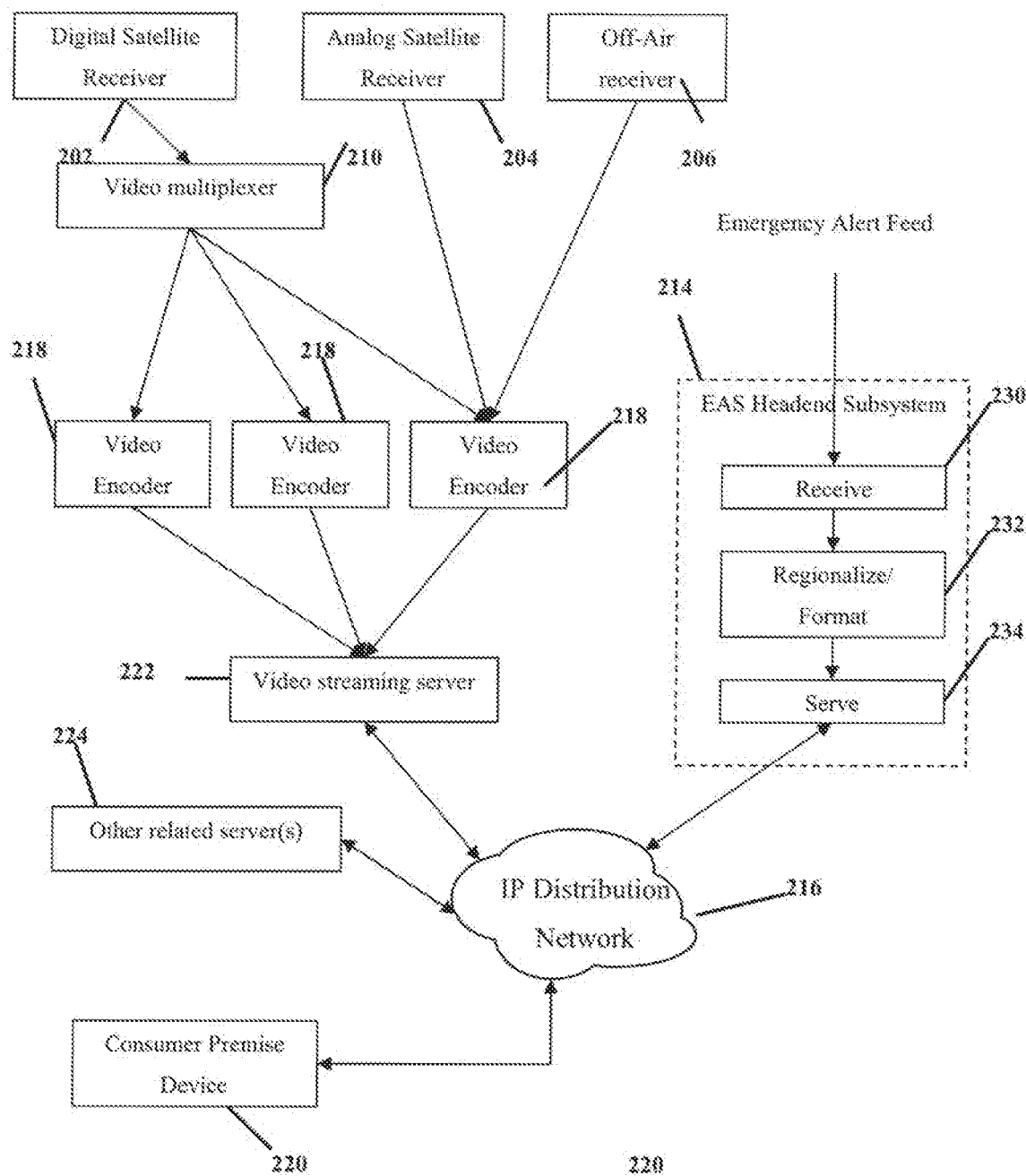
FIG. 2 is a functional block diagram illustrating one exemplary packet-switched distribution network that useful with the present disclosure.

Referring now to FIG. 2, an exemplary configuration of a packet-switched network useful with the present disclosure is illustrated. While described in the context of an Internet Protocol Television (IPTV) network, it will be recognized that the principles of the disclosure can be extended to other transport modalities and network paradigms.

The network 200 of FIG. 2 effectively operates logically "along side" the in-band content delivery system described with respect to FIGS. 1 and 1a, and shares many common elements. It includes digital satellite receivers 202, analog satellite receivers 204 and off-air receivers 206 deployed within the content (e.g., cable) network in order to receive content such as broadcast television programs. This content is then distributed over the cable network. With respect to the IPTV network, the digital satellite feed received via the receiver 202 is sent to a video multiplexer 210 that provides one or more digital programs to one or more video encoders 218 to transcode/transrate or otherwise process incoming digital video streams to a format suitable for loading onto the video streaming server.

An Emergency Alert Service (EAS) head-end server subsystem 214 is shown to operate in conjunction with the in-band and IPTV content systems described above. This subsystem includes a receiver 230 responsible for receiving emergency alert messages from message feeds (e.g., in the form of RF communications on government designated disaster message broadcast frequencies), or by other means. The messages or data thus received are converted into a digital data format suitable for transmission over the IPTV network using a formatting unit 232. The formatting unit 232 also optionally regionalizes or localizes the data to allow for "targeted" delivery as discussed in greater detail subsequently herein. Note that in FIG. 2, while localization and formatting are shown as a single logical functional block, actual implementations of these functions may be on separate (and even disparate) platforms.

The subsystem 214 also contains one or more servers 234 that operate in conjunction with other servers in the network, in a manner described further herein, in order to transmit emergency messages/content to the client devices 220 over the interposed IP distribution network 216.

The video streaming server 222 and the EAS message server 234 are in turn connected to the Content Distribution Network 216 (which in the context of a cable network, may comprise, inter alia, the coaxial "drop" 108 of FIG. 1 between the CPE 110 and CMTS 106). Other architectural elements connected to the content distribution network 216 are shown as "other related servers" 224 in FIG. 2. Client devices 220 (such as PCs connected to cable modems, wireless user devices in communication with access points (APs) or gateways, etc.) are connected to the content distribution network and perform the functions of, inter alia, decoding and displaying video and EAS signals.

It will be appreciated that several different configurations of the above-described IPTV network are possible consistent with the present disclosure. For example, the video encoders 218 shown in FIG. 2 may be configured to produce one or more bit streams for the same content. Such bit streams could have different bit rates as a function of suitability for transmission over the IP network (e.g., low, medium and high bitrate streams for various rate services, such as dial-up, DSL and cable modem IP services, respectively), and/or different encoding formats conforming to audio/video encoding standards such as Real or MPEG or Windows Media Player (WMP). Similarly, the EAS head-end server subsystem 214 could serve the emergency messages or content to the client devices in unicast, multicast or broadcast manner.

It is noted that while localization of emergency messages or video is typically a highly desired feature, this feature may be omitted or obviated in certain applications, such as when all client devices that a given head-end is serving are in the same emergency alert area. Also, the placement of the localization function within the network can be varied; including e.g., (i) only at the head-end 150, (ii) partly at the head-end and partly at the client devices 220, or (iii) exclusively at the client devices 220.

Furthermore, the emergency alert data received by the network are typically made available by governmental agencies by broadcasting them at a pre-designated frequency over the air. In some implementations of content distribution networks, these messages may be received in one location within the network, and carried over another medium (e.g., fiber optic or millimeter wave transmission) to other head-ends or nodes of the network. In such embodiments, the EAS receiver 230 may not contain an explicit over-the-air receiver, but still receive such messages.

Localization of Emergency Alert Messages—

Localization refers to "editing" the emergency alert messages or data received by the network operator such that (i) the appropriate subset of client devices to whom the message may be applicable is able to receive and decode it, and (ii) other client devices are able to discern that the emergency alert message is not targeted for or applicable to them. As but one example, the emergency alert message specification for cable broadcast (ANSI standard J-STD-042-2002, incorporated herein by reference in its entirety) describes localization in the form of county code and subdivision.

In an IPTV deployment such as one implemented over a cable data network, the locations of modems to which EAS clients are attached is available at a network-side server. This may comprise, for example, a MAC address or device ID associated with a given cable modem, gateway, user device, or the like. Furthermore, "ranging" information may be used to validate an installation of a premises device, based on expected signal propagation delays (thereby telling the network operator when the device has been moved to another location within the network). Such information can be taken advantage of when formatting the EAS messages for targeting a specific subset of client devices.

Hence, in one aspect, the present disclosure affords significant capability in terms of tailoring the delivery of EAS messages to particular groups of subscribers. For example, the MSO may maintain a database of cable modem or gateway device IDs or MAC addresses and a corresponding postal zip code for each such modem/gateway. When an tornado alert message is issued by NWS for certain counties or zip codes for example, the MSO can rapidly access this database to determine which device IDs/MAC addresses to which to route the EAS message. Certain zip codes may merit a first type of message (e.g., critical warning), while others may merit a less dire or different type of alert.

It will be appreciated that information other than zip code can be used as well (or in conjunction) as a basis for differentiating message delivery and/or content, such as e.g., subscriber latitude/longitude, street address, elevation above sea level, etc. For example, commercially available software packages are capable of mapping given street addresses to an elevation map, earthquake/fault/liquefaction map, etc. Hence, the MSO can pre-store such information for each device ID/MAC address, and hence tailor the alert warnings for a heavy rain storm primarily to low-lying areas. Radius from a given point or coordinate may also be used as a targeting or screening criterion (e.g., every network subscriber within 5 miles of a given coordinate is provided a first type of warning, while everyone outside 5 miles is given a second type of warning). Myriad other such "tailoring" approaches are possible according to the present disclosure.

It will also be appreciated that other information, such as that of a transient nature, may be used for the purposes of tailoring delivery of emergency data. For example, a wireless (e.g., Wi-Fi) enabled user device may associate with an AP in e.g., a location outside of their address of record, for example at a local or distant coffee shop. The user device may be associated with a network subscriber, and hence the network operator (e.g., MSO) may wish to provide emergency data to that user in situ (i.e., at the coffee shop) under at least two circumstances: (i) there is an impending emergency affecting the coffee shop, and (ii) there is an impending emergency affecting the user's premises. Hence, by identifying the user uniquely, and their "transient" location (in this example, via association with the coffee shop's AP, a GPS receiver on the mobile device, or otherwise), the MSO can tailor or filter alerts for the foregoing two circumstances. Specifically, in one implementation, logic on an MSO or third-party server is used to correlate user/subscriber IDs to geographic locations within regions affected by emergency alerts, and provide such alerts at the transient location. In one variant, the logic evaluates the region affected by the emergency alert against both the user's transient location and their premises location, and provides the alert to the user's registered location (e.g., to their DSTB or cable modem or gateway), as well as their transient location (the latter via e.g., an interposed IP network, such as the Internet, and/or via third party service provider network, such as one providing broadband access to the coffee shop's Wi-Fi AP).

It will also be appreciated the foregoing tailoring can be applied in the context of familial, employment, or other relationships. For example, an emergency alert affecting a geographic area, building, school campus, etc. of a network subscriber can be extended to immediate family, co-workers, fellow students, etc. according to one or more prescribed distribution rules. For instance, the family of an elderly subscriber whose residence is affected by an emergency may wish to be notified, so that they can render immediate assistance. Such rules/relationships can be, e.g., specified at the time of account setup, periodically updated, etc., so that each subscriber has a current distribution "net" associated therewith.

Authentication of Emergency Alert Messages—

The intended end effect of an emergency alert message on a client device is disruptive to the viewing of audio/video program or other uses by the user (i.e., "forced" viewing/hearing of the alert message in whatever form it is delivered). Accordingly, when invoked, the EAS delivery system will preempt (or at very least significantly detract from) all other modalities of content delivery. Moreover, "spoofing" of emergency alerts can be deleterious, and even harmful, to recipients, such as where they evacuate their home in response to the spoofed alert. It is therefore critical to provide a method and apparatus that is robust, such that any unauthorized use of the emergency alert subsystem is: (i) prevented from occurring, and (ii) readily detected and defeated in case the methods of preventing such surreptitious access are somehow bypassed. Such security methods become even more critical when the EAS client application running on the client device is able to force a re-tuning of the client device to the emergency alert video stream/feed and/or trigger alert responses of client devices within the consumer premises network. Thus, by authenticating the EAS, false alarm responses may be reduced or eliminated.

Figure 3:
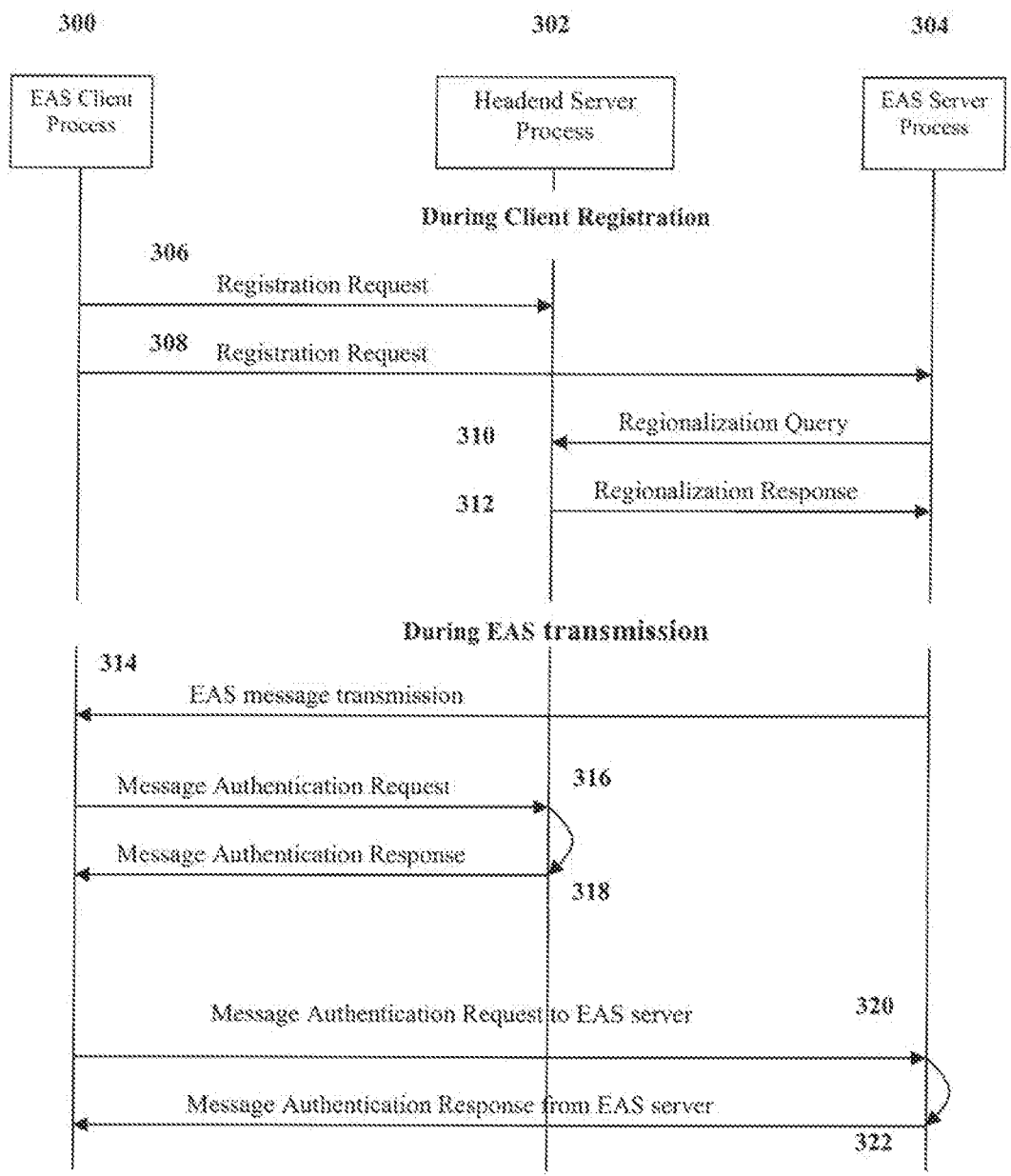
FIG. 3 is graphic representation of an exemplary message exchange protocol showing messages exchanged between various elements of the distribution network of FIG. 2 signal exchange diagram highlighting two exemplary embodiments of the present disclosure, wherein the emergency alert messages received by the client devices are explicitly validated by communication between the client device 220 (as represented by the EAS process 300) and a head-end server process 302 (or alternatively the EAS server process 304).

FIG. 3 is a signal exchange diagram highlighting two exemplary embodiments of the present disclosure, wherein the emergency alert messages received by the client devices are explicitly validated by communication between the client device 220 (as represented by the EAS process 300) and a head-end server process 302 (or alternatively the EAS server process 304).

FIG. 3 shows an emergency alert message transmission 314 by the EAS server process 304 to the client device 220

(and its EAS process 300). A request/response pair of messages 316, 318 are also shown, wherein upon reception of the EA message 314, the EAS client 300 requests its authentication from a head-end server process 302. In various embodiments of the disclosure, the head-end server may comprise for example a digital certificate authority (CA) server, a network management server associated with a cable modem network, or yet another type of server entity adapted for authentication and/or identification functions.

In an alternate embodiment of the request/response authentication process, message exchanges 320, 322 can be used as shown in FIG. 3. In this exchange, the EAS client 300 sends a confirmation request back to the EAS server process 304 at the IP address known to the client to verify that the EAS message was indeed sent by the EAS server process.

Various other embodiments of the message exchange/authentication process are possible according to the disclosure. These include, but not limited to, use of an encrypted data transmission (e.g., using secure HTTP transmission), and data hashing techniques, such as those based on keys. Some data networks may also include a "firewall" or other comparable software mechanism that filters messages arriving from outside the network on TCP or UDP ports specifically assigned to EAS messages.

Timing windows or other constraints may also be used to assist in identifying "spoofed" EAS messages. For example, alerts may be issued only at prescribed intervals or times. After considering propagation/delivery delays, certain windows of eligibility can be established, and local clocking (e.g., SI time reference or the like) can be used to authenticate or filter the message based on time of receipt. As a simple example, an MSO may only issue EAS messages to subscribers on certain temporal boundaries (e.g., only at 00.00 SI time reference), or only at no more than a prescribed frequency (e.g., once every 5 minutes). Hence, any alleged EAS events outside of those criteria would be at minimum identified or flagged for further evaluation.

Myriad other approaches and combinations will be recognized by those of ordinary skill when provided the present disclosure.

Methods—

Various embodiments of the present disclosure are directed to schemes for providing indications of emergency messages received via a network infrastructure to devices, such as those within or associated with a consumer premises network.

In one embodiment, a consumer premise equipment (CPE) is configured to provide indications of a received Emergency Alert Message (EAS) message from a cable network infrastructure to devices within a consumer premises network. Accordingly, a person residing within the consumer premise may be informed of an emergency even though a device that displays the EAS message (e.g., a television) is powered-off, and thus unable to inform the resident of the emergency. The consumer premise network may comprise a number of different network types and technologies. For example, a CPE may be configured with to communicate with a variety devices within the consumer premises through the use one or more network interfaces such as those compliant with IEEE. Std 802.11, IEEE-1394, Zigbee®, Z-Wave, Bluetooth®, Ethernet, etc.

Figure 4:
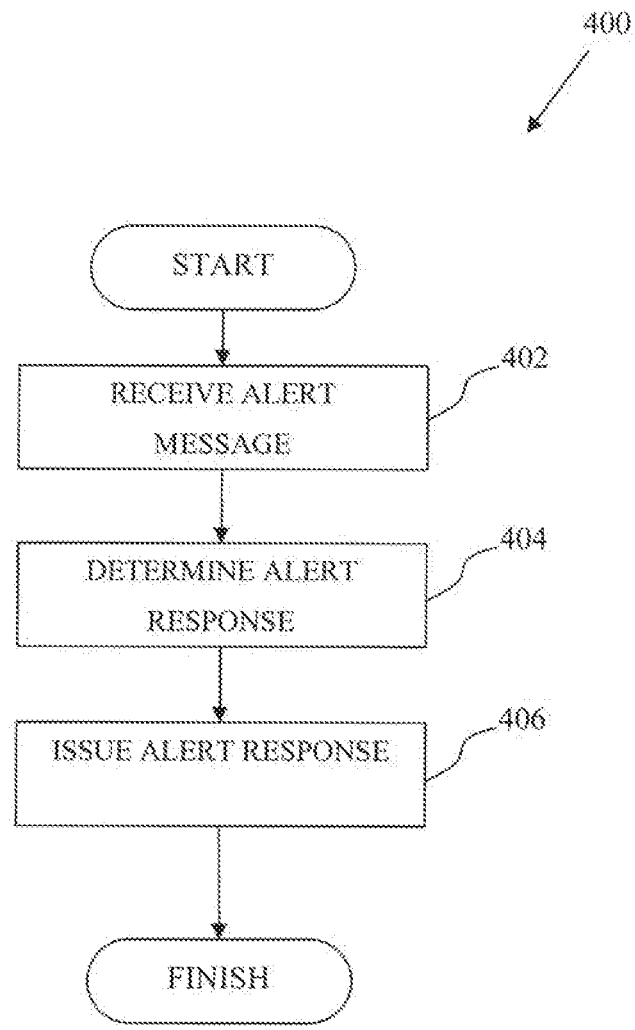
FIG. 4 is a logic flow diagram illustrating an exemplary embodiment of a general method of providing indications of a received emergency alert message.
Figure 4A:
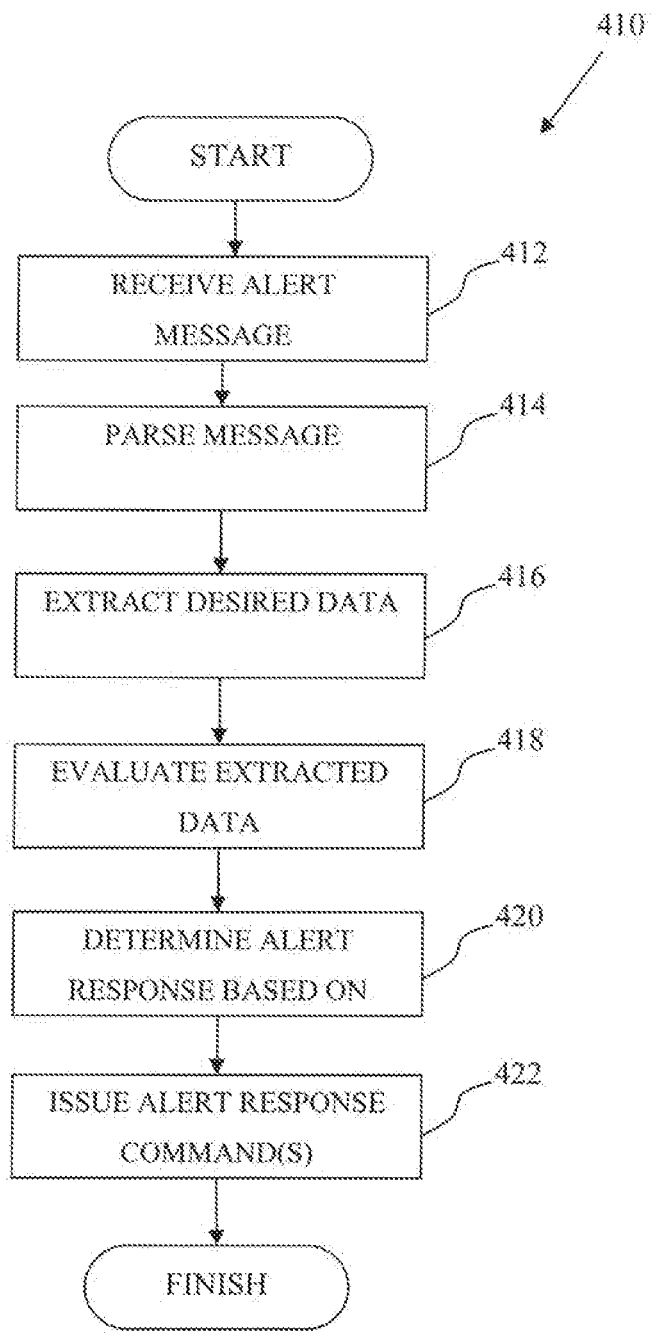
FIG. 4A is a logical flow diagram illustrating another embodiment of the method of providing indications of a received emergency alert message.
Figure 4B:
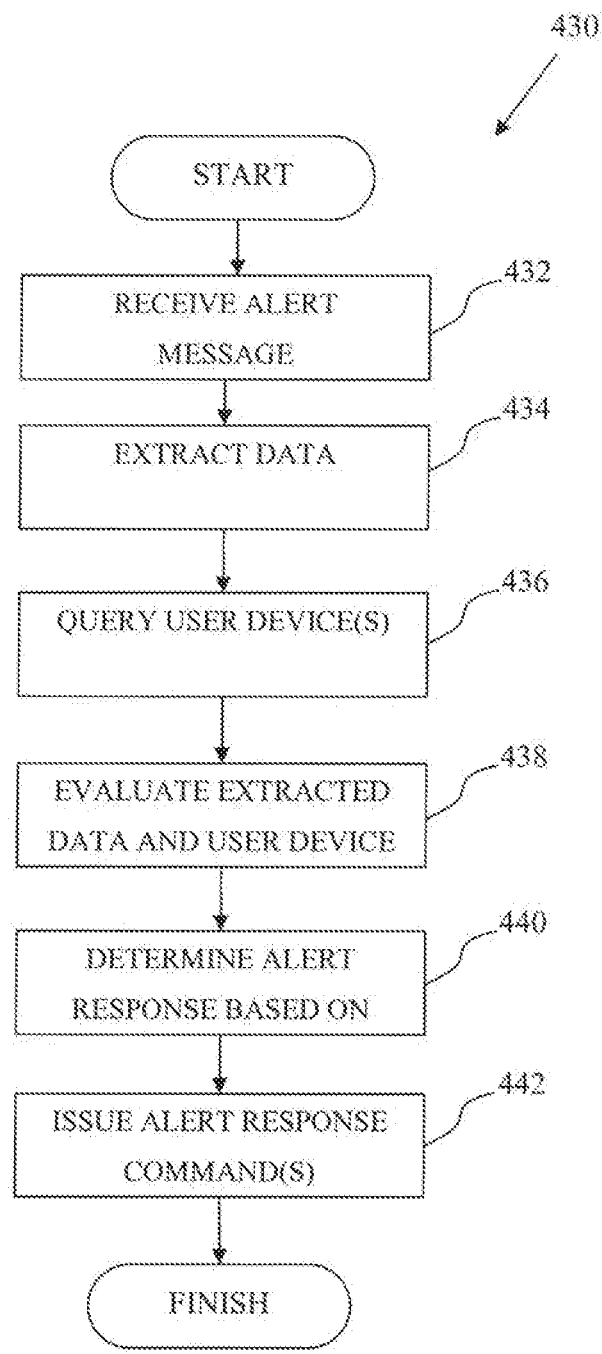
FIG. 4B is a logical flow diagram illustrating yet another embodiment of the method of providing indications of a received emergency alert message.

Referring now to FIG. 4, one embodiment of a generalized method for providing indications of a received emergency alert message to devices is disclosed.

At step 402, an alert message is received. In one implementation, the alert message comprises an EAS message received over a managed (e.g., cable or satellite) network infrastructure at a set top box (STB). The EAS message is configured with a prescribed format; e.g., a Specific Area Message Encoding (SAME) header, an attention signal, an audio announcement, and a digitally encoded end-of-message marker. An EAS message may be transmitted/received only once, or a multitude of times, such as at a prescribed frequency as described supra.

At step 404, an alert response is determined. In one embodiment, the alert response is determined by analyzing the EAS message, and comparing it against one or more alert response rules. The analyzed content of the EAS message may be based on e.g., the entire EAS message, or one or more portions thereof, and/or capabilities of the devices in which the alert response are to be issued. The types of the alert response may be selected from a variety of possible alerts, such as auditory or visual alerts.

In one variant, capabilities of the devices within the consumer premises network are determined. In one exemplary implementation, the device capabilities are determined by one or more queries to the devices, such as to a hardware registry, API, or other mechanism within the device. In response, the devices will provide the requestor with all or a portion of the devices capabilities. The portion of the devices capabilities may be limited to auditory and/or visual display functionality. For example, a queried device may comprise a cellular telephone or smartphone. In response to the query, the cellular device may relay device functionality relating to speakers, display, vibration modes, photo flash, or any other auditory/visual functionality contained therein. The query may be further configured to obtain functionality of any devices associated or otherwise in data communication with the originally queried device. For example, the cellular telephone may have other devices connected via the cellular telephone's network interfaces (e.g., LTE, Wi-Fi, Bluetooth®, Universal Serial Bus (USB), IEEE 1394, Zigbee®, Z-Wave, NFC/ISO 14443, etc.). One salient advantage of querying for functionality of the associated devices is to expand the number of possible devices in which alert responses may be issued, as the issuing entity may not be otherwise able to communicate with the associated devices, and/or increase the amount of types of alert responses available for issuance.

In another implementation, the capabilities of the devices are selectable by a user. The user may configure the issuing system to recognize and associate various devices via a user interface. Alternatively, the issuing system may determine the available devices, and prompt a user to configure the one or more settings relating to the functionality of the available devices.

In another implementation, the device's indigenous systems are queried to attempt to divine whether the device is actually in use and in the possession of the user. An emergency alert issued to a device that is sitting unattended (e.g., in a user's automobile glove compartment) may be of little or no utility, or may need to be altered in their delivery. Hence, by accessing indication of activity (e.g., output from the device's accelerometer, indicating motion, periodic inputs via the touch screen display, power-on indications, etc.), the alerts can be tailored to the operational environment. Consider, for instance, the aforementioned case where the user's smartphone is in their auto glovebox. If it is determined that the device is inactive (e.g., in power-save mode, and no recent inputs), an otherwise normal visual or vibrational alert notification might be altered or expanded to include audio speakers on the smartphone, such that the user has a better chance of hearing the device while e.g., driving).

Similarly, the devices' Wi-Fi or BT interface could communicate with the vehicle's onboard info-tainment system, to play the alert out the audio speakers, and/or via touch-screen in-dash display.

In one variant, the EAS message is analyzed based on the SAME header. The SAME header contains various information relating to the alert event associated with the EAS message. For example, the SAME header may contain information relating to the originating entity for the alert, a description of the alert event, expected duration of the alert event, date and time the alert message was issued, etc. By analyzing the contents of the SAME header, the contents may be compared against the one or more alert response rules in order to determine the appropriate alert response. For example, certain categories of alert event might dictate a more frequent or invasive re-transmission and/or playout schedule on the target user device, thereby adding to the urgency, as described in greater detail below.

In another implementation, the EAS message is analyzed based on the content on the auditory announcement. By analyzing the auditory announcement, emergency related content can be derived such as an event type (e.g., tornado, fire, earthquake, etc.). Additional information may be derived such as a perceived severity of the emergency based on the auditory message contents. In one variant, the auditory announcement in converted into a text format via a speech recognition process. Once converted into the text format, the contents of the text may be analyzed based on keywords associated with emergency type and various aspects thereof, such as severity. For example, content relating to a fire may include information regarding percentage of containment, and/or rate of spreading may be derived and used to determine an appropriate alert response. Additionally, the content of the text message may be analyzed to determine an approximate and/or actual location of the emergency event. By determining the location of the emergency event, rules may be configured to compare the location of the event to the location of the consumer premises. Thus, for example, more proximate emergency events can be configured to trigger a different alert response, as compared to a less proximate emergency event based on the one or more alert response rules.

In one embodiment, the one or more alert response rules are determined by an entity associated with the managed network infrastructure. A CPE responsible for receiving EAS message from the network infrastructure is pre-programmed with the one or more alert response rules. The CPE may be further configured to receive configuration updates to modify the one or more alert response rules. The configuration updates are received over one or more network interfaces of the CPE from the network operator (i.e., via in-band or out-of-band signaling of the cable network) or via other entities, such as a manufacturer of the CPE, via a network connection interface.

In another embodiment, the one or more alert response rules are at least partly configurable by a user. In one variant, the CPE is configured to allow a user to directly adjust the one or more alert response rules via a user interface of CPE. In another implementation, the one or more alert response rules are configurable by a device in data communication with the CPE. Thus, alert response rules may be remotely modified by the user via another device having appropriate permissions. The device comprises, in one exemplary illustration, a home automation system configured to control one or more household devices (e.g., lighting, door locks, etc.). The home automation system is configured to receive communications from the CPE and other devices within the consumer premise system. The home automation system may be further configured with home security functionality responsible for communicating with various security devices, such as sirens, strobe lights, motion sensors, etc., and the latter can even be leveraged for delivery of EAS information (such as where in the case of an imminent danger, the premises security alarm siren is activated, without contacting the outside monitoring service).

In one embodiment, the determined alert response comprises an alert prioritization level. After the one or more alert response rules and EAS message are analyzed, the associated alert is classified. For example, the alert classification may comprise a multitude of alert priorities, ranging from various levels of higher to lower priorities. Higher alert priorities may be configured to increase an amount of alert responses triggered, as previously noted. In addition, the alert proprieties may be configured to limit the alert configuration options available to the user. For example, a user may restrict the type of auditory and visual alarm responses for alert priorities with a lower priority. However, a high level alert priority may restrict a user's ability to modify the auditory and visual alarms at least partly or even completely, so as to avoid the user inadvertently or intentionally bypassing critical alert functions.

In another exemplary embodiment, the determined alert response comprises one or more commands to trigger execution of the desired alert responses. The one or more commands are configured to instruct the respective devices to implement the determined alert responses. The one or more commands do not contain any information relating to the EAS message or content thereof. Instead, the commands are configured to drive the desired functionalities of the devices within the consumer premise network. For example, commands may be used to transmit a "turn on using pattern x" command to a "siren module" pre-programmed with different audible output patterns (tones, durations, volumes, synthetic voices, stored pre-recorded messages, etc.) and/or a "blink at a rate of y" command to one or more light switches, smart bulbs, "strobe" modules, etc. within the consumer premise network.

At step 406, an alert response is issued. In one embodiment, the issued alert response comprises issuing an indication of a priority of the received EAS. In such an exemplary embodiment, the receiving devices within the consumer are configured to issue a respective response based on the received alert priority level. Thus, an issued alert response may contain no actual information related to content of the received EAS message, but instead trigger auditory and/or visual responses indicative of the associated event. For example, indications of the emergency event may be color-coded, trigger specific auditory alarms, etc. Additionally, the devices in the consumer premise may be configured to issue alert responses to devices that are associated with the device based on the received indication.

In another embodiment, the issued alert responses comprise commands configured to directly activate capabilities of the devices to provide the determined alert responses. The commands may be further configured to instruct the receiving device to forward and/or issue commands itself to devices that are in data communication with the receiving device. Thus, the receiving device useable as a proxy to allow commands to be issued to devices in which the issuing entity could not otherwise communicate therewith. The commands may be configured to mandate the devices to perform the determined alert responses. Additionally, the commands may be configured to allow selectively performance of the alerts associated to the commands by the receiving devices.

Consumer Premise Network Architecture—

Figure 5:
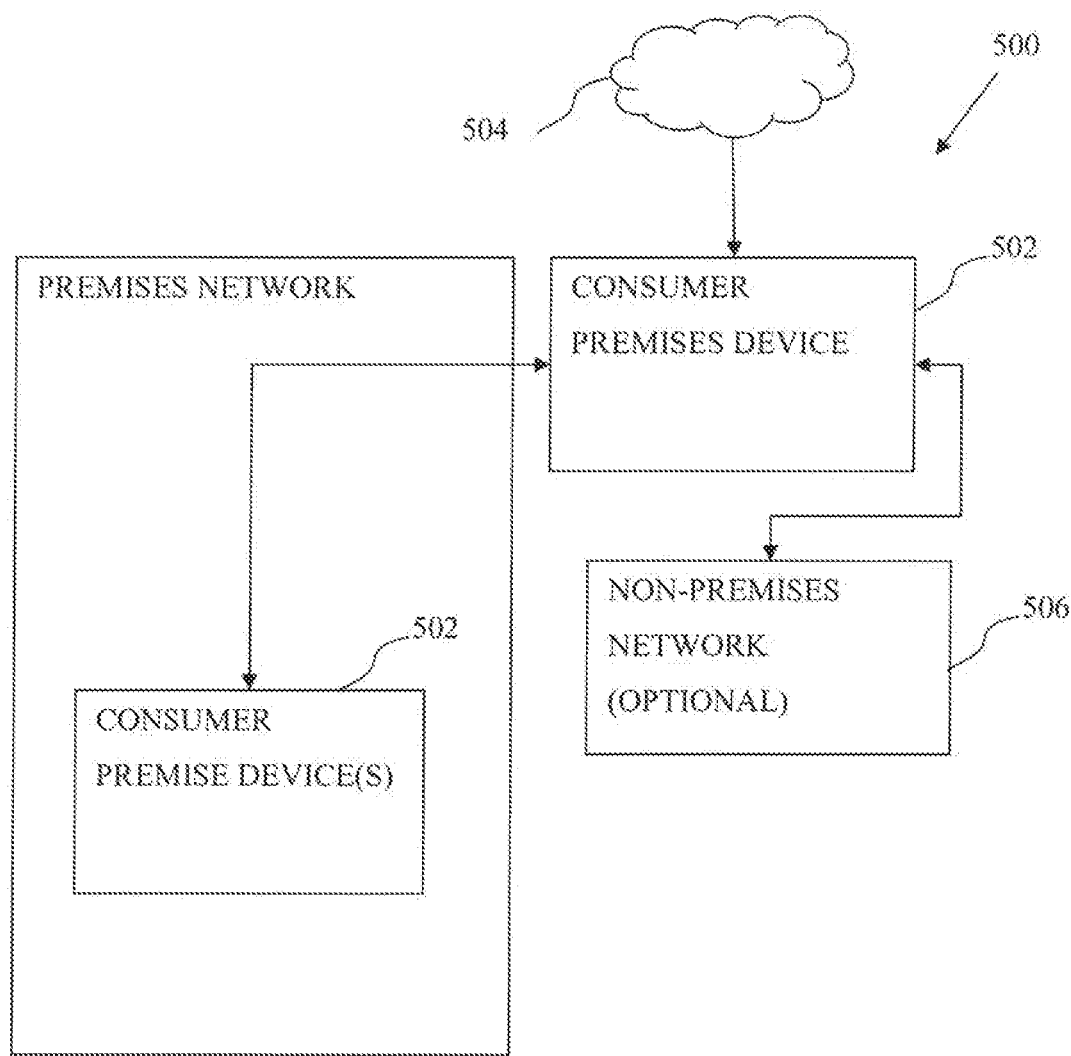
FIG. 5 is a functional block diagram illustrating an exemplary consumer network premises architecture in accordance with the present disclosure.

Referring now to FIG. 5, an exemplary consumer premise network architecture 500 configured according to the present disclosure is described. In one embodiment, the consumer premise network 500 comprises a plurality of consumer premise equipment (CPE). At least one CPE 502 is configured to receive EAS message from a network 504 (EAS CPE). The EAS CPE is configured to analyze the received EAS message and determine appropriate alert responses for a respective CPE. In one implementation, the EAS CPE is configured with an alert rules engine to analyze a received EAS against one or more alert response rules. The EAS CPE is further configured to communicate with various other CPE devices in order to issue alert commands, including CPEs consisting of auditory and/or visual display related functionalities.

In one implementation, one of the CPE 502 comprises a device responsible for managing and controlling a home automation system (Home CPE), such as the exemplary IntelligentHome™ home automation system provided by the Assignee hereof. The Home CPE may optionally be configured with one or more interfaces to communicate with devices outside of the consumer premise network architecture 500 via, for example, a cellular network connection 506. In one implementation, the Home CPE is configured to modify the alert rules engine of the EAS CPE. The modification may be communicated via an external entity using a network interface of the Home CPE. Alternatively, the Home CPE is configured with a user interface to allow a user within the consumer premise network to modify at least partially the alert rules engine. The Home CPE is further configured to communicate and/or control certain devices and functionalities associated with the premise (e.g., house). Such devices and functionalities may include, but are not limited to, lighting control, motion sensors, auditory and/or visual alarms. Furthermore, such devices may be directly or indirectly controlled by the Home CPE and be connected thereto over a variety of heterogeneous network types. Additionally, it may be recognized that the EAS CPE and Home CPE functionalities are included into a single CPE or has functionalizes as discussed herein spread across various ones of CPE.

Additionally, one or more of the CPE 502 of the consumer premise may be configured with a supplemental rules engine responsible for implementing commands received from the EAS CPE. In one implementation, the supplemental rules engine is configured to interpret a received command and determine commands to issue on its own to implement the desired alert responses. For example, a supplemental rules engine may receive a priority level of an EAS message and implement one or more alert responses associated therewith. In another implementation, the supplemental rules engine receives commands that direct indicate the alert responses to implement, such as sound an alarm. The supplemental rules engine may be additionally configured to be modifiable by a user or filter out certain received commands to be ignored from an EAS CPE. Accordingly, one advantage of the present disclosure allows for a highly customizable system to allow a user within a consumer premise network to selectively design and implement alerts in response to a received EAS message.

Consumer Premise Equipment

Figure 6:
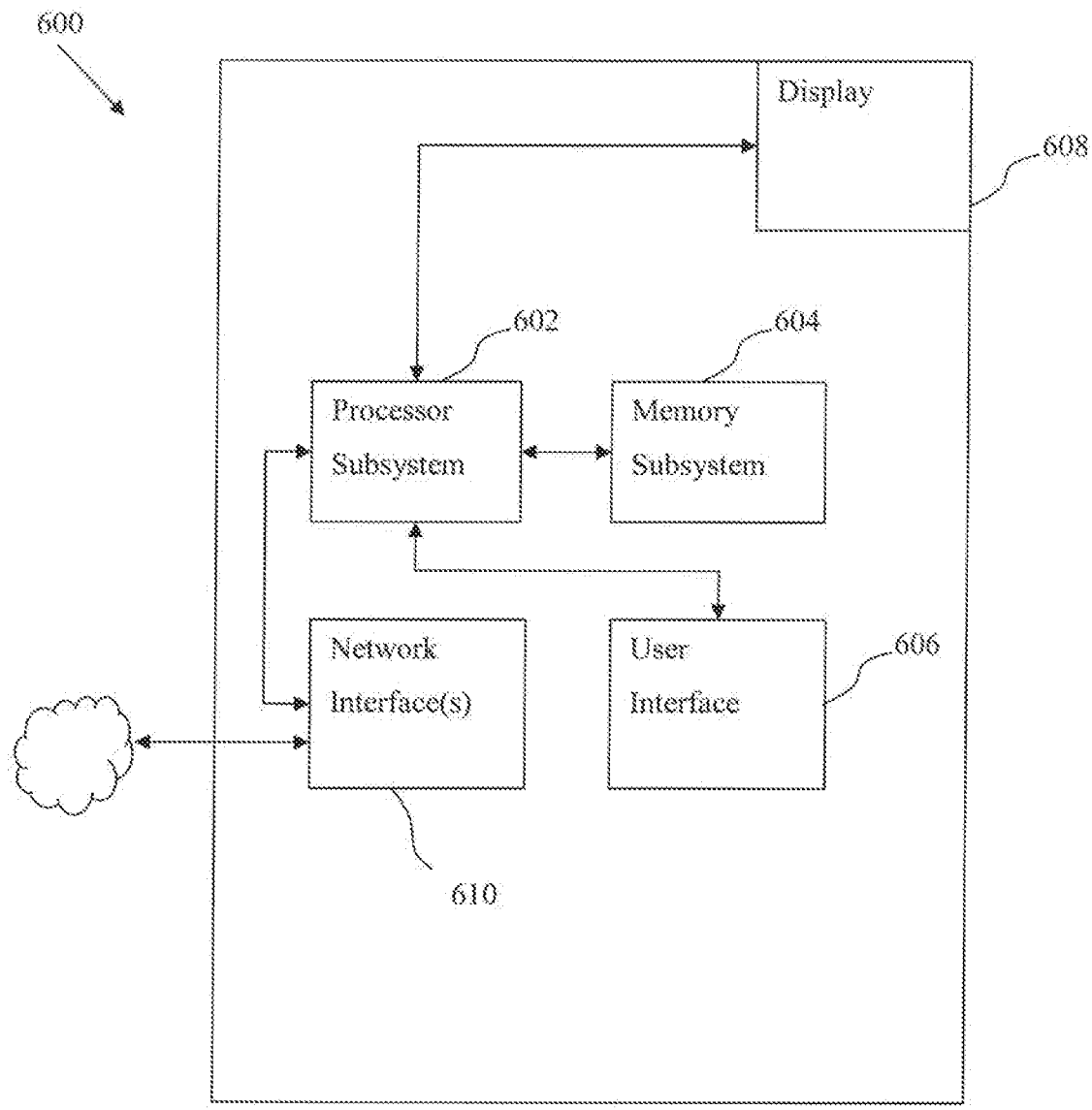
FIG. 6 is a functional block diagram illustrating an exemplary consumer premises equipment (CPE) apparatus in accordance with the present disclosure.

Referring now to FIG. 6, one exemplary embodiment of the consumer premise equipment 600 (CPE) configured in accordance with the present disclosure is described in detail. A CPE 600 in the context of the present disclosure generally comprises a computerized device running an operating system. The CPE 600 includes a processor subsystem 602, memory subsystem 604, user interface 606, display device 608, and one or more network interfaces 610 including for example an RJ-45 LAN connector with Ethernet LAN card, USB ports, IEEE-1394 "Firewire" interface, wireless interface (such as 802.11 LAN card, WiMAX 802.16 interface, 802.15 PAN interface, Bluetooth interface), Zigbee, or Z-wave and so forth.

The processor 602 of the exemplary CPE 600 is configured execute one or more computer programs which enable the above-disclosed functionalities as discussed above with respect to FIGS. 1-5. In other words, a computer program running on the processor 602 may perform the functions of the herein described alert rules engine (i.e., to analyze a received EAS against one or more alert response rules, etc.). In another embodiment, the computer program is configured to enable the exemplary CPE 600 to perform the functions of the herein described supplemental rules engine (i.e., to implement commands received from the EAS CPE).

It is further appreciated that the computer programs which enable the aforementioned functionality may be pre-installed on the apparatus or may be downloaded from a network (such as e.g., the network 216 disclosed in FIG. 2).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

What is claimed is:

1. Computerized apparatus configured for use in a content delivery network, the computerized apparatus comprising:
   a processor apparatus;
   one or more interfaces in data communication with the processor apparatus; and
   a non-transitory computer readable storage medium with at least one computer program stored thereon, the at least one computer program configured to, when executed, cause the computerized apparatus to:
   receive event data;
   identify one or more computerized client devices in communication with the content delivery network;
   determine that at least one first computerized client device of the one or more computerized client devices has first capabilities;
   determine that at least one second computerized client device of the one or more computerized client devices has second capabilities, wherein the first capabilities are different from the second capabilities;

format the event data into at least a first event command and at least a second event command, wherein the first event command is different from the second event command;

transmit the first event command to the at least one first computerized client device; and transmit the second event command to the at least one second computerized client device.

2. The computerized apparatus of claim 1, wherein the at least one first computerized client device comprises a premises device, and wherein the first event command causes the first computerized client device to cause execution of a premises device functionality.

3. The computerized apparatus of claim 2, wherein the at least one first computerized client device comprises a lighting device, and wherein the causing execution of the premises device functionality comprises causing actuating the lighting device at a predetermined rate.

4. The computerized apparatus of claim 2, wherein:
the event data comprises emergency alert data;
the at least one first computerized client device comprises a security alarm siren; and
the causing execution of the premises device functionality comprises causing activation of the security alarm siren without contact of an external monitoring service.

5. The computerized apparatus of claim 1, wherein the determination of the first capabilities comprises determination of a plurality of capabilities from data representing a corresponding selection by a user of the first computerized client device, the corresponding selection received via a computerized user interface associated with the computerized apparatus.

6. The computerized apparatus of claim 5, wherein the determination of the second capabilities comprises determination of a plurality of capabilities from data representing corresponding selections by a user of the second computerized client device, the selections of the user of the second computerized client device received via the computerized user interface.

7. The computerized apparatus of claim 1, wherein the determination of the second capabilities comprises transmission of a message to the second computerized client device, the message configured to cause a response from the second computerized client device, the response comprising data indicative of at least one of the second capabilities.

8. The computerized apparatus of claim 1, wherein the determination of the first capabilities comprises a determination that the first computerized client device has both (i) a prescribed audio rendering capability and (ii) a prescribed visual display functionality.

9. The computerized apparatus of claim 1, wherein the determination of the first capabilities comprises a determination of whether: (i) the first computerized client device maintains an active wireless connection, or (ii) the first computerized client device is in an inactive state.

10. The computerized apparatus of claim 9, wherein the formatting of the event data into the first event command is based at least in part on the determination of whether: (i) the first computerized client device maintains the active wireless connection, or (ii) the first computerized client device is in the inactive state.

11. The computerized apparatus of claim 10, wherein the at least one computer program is configured to, when executed, cause the computerized apparatus to: based at least in part on a determination that the first computerized client device is in the inactive state, cause utilization of a first command format which is configured to cause activation of an expanded set of notification mechanisms as compared to a first command format used when a determination that the first computerized client device is not in the inactive state.

12. The computerized apparatus of claim 1, wherein:
the determination of the first capabilities comprises a determination that the first computerized client device is in data communication with a third computerized client device; and
the first event command is configured to cause the first computerized client device to transmit a third event command to the third computerized client device.

13. The computerized apparatus of claim 1, wherein the at least one computer program is further configured to, when executed, cause the computerized apparatus to evaluate the event data, the evaluation comprising an evaluation of a header of the event data to determine at least a category of an event, and wherein the formatting of the event data is based at least in part on the determined category of the event.

14. The computerized apparatus of claim 1, wherein the formatting of the event data is based at least in part on the determination of the first capabilities.

15. The computerized apparatus of claim 1, wherein the at least one computer program is further configured to, when executed, cause the computerized apparatus to evaluate the event data, the evaluation comprising authentication of the event data, the authentication of the event data comprising confirmation that the event data originated from a server authenticated to the content delivery network as a valid event data source.

16. The computerized apparatus of claim 15, wherein the authentication of the event data further comprises use of an encrypted data transmission.

17. A computerized method for providing emergency event data to a plurality of computerized client devices associated with a respective plurality of users, the computerized method comprising:

receiving emergency event information associated with a prescribed geographical location;

formatting the emergency event information into at least a first type of emergency message;

determining that a first device of the plurality of the computerized client devices meets a prescribed relationship to the prescribed geographical location, wherein the first device is associated with a first user;

determining that a second device of the plurality of the computerized client devices does not meet the prescribed relationship to the prescribed geographical location;

determining that a second user associated with the second device of the plurality computerized client devices is affiliated with at least one of (i) the prescribed geographical location, or (ii) the first user; and transmitting at least the first type of emergency message to the first device and the second device.

18. The method of claim 17, wherein:
the formatting the emergency event information into at least the first type of emergency message comprises formatting the emergency event information into at least the first type of emergency message and a second type of emergency message; and
the transmitting at least the first type of emergency message comprises transmitting the first type of emergency message to the first device, and the second type of emergency message to the second device.

19. The method claim 17, wherein the determining that the second user associated with the second device is affiliated with at least one of (i) the prescribed geographical location or (ii) the first user, comprises determining via a user database that the second user has a familial or employment relationship to the first user.

20. The method claim 17, wherein the determining that the second user associated with the second device is affiliated with at least one of (i) the prescribed geographical location or (ii) the first user, comprises determining via at least a user database that the second user has previously indicated an affiliation to a premises meeting the prescribed relationship to the prescribed geographical location.

21. A computerized network apparatus configured for distribution of event data to a plurality of computerized client devices, the computerized network apparatus comprising:
  processor apparatus;
  one or more data interfaces in data communication with the processor apparatus; and
  storage apparatus in data communication with the processor apparatus, the storage apparatus having at least one computer program stored thereon, the at least one computer program configured to, when executed on the processor apparatus, cause the computerized network apparatus to:
    receive event data associated with a prescribed geographical location;
    format the event data into a first type of event command;
    determine that a location of a first device of the plurality of computerized client devices meets a prescribed relationship to the prescribed geographical location, wherein the first device is associated with a first user;
    determine that a location of a second device of the plurality of computerized client devices does not meet the prescribed relationship to the prescribed geographical location;
    determine that a second user associated with the second device of the plurality of computerized client devices is affiliated with at least one of: (i) the prescribed geographical location, or (ii) the first user; and
    cause transmission of at least the first type of event command to the first device and the second device.

22. The computerized network apparatus of claim 21, wherein the causation of transmission of the at least first type of event command to the first device and the second device is based at least in part on:
  a) the determination that the location of the first device of the plurality of computerized client devices meets the prescribed relationship to the prescribed geographical location; and
  b) the determination that the second user associated with the second device of the plurality of computerized client devices is affiliated with the first user via data previously submitted by the first user indicating association of the second user to the first user.

23. The computerized network apparatus of claim 21, wherein the at least one computer program is further configured to, when executed on the processor apparatus, cause the computerized network apparatus to access user configuration data associated with the first device, the user configuration data at least in part specifying a user interface (UI) modality to be utilized for communicating event data; and
  wherein the formatting of the event data into the first type of event command comprises formatting according to a prescribed message protocol that is consistent with the UI modality based at least partially on the user configuration data.

24. The computerized network apparatus of claim 21, wherein the at least one computer program is further configured to, when executed on the processor apparatus, cause the computerized network apparatus to determine a classification of the event data; and
  wherein the formatting of the event data into the first type of event command is based at least partially on the classification of the event data.

25. The computerized network apparatus of claim 21, wherein the determination that the second user is affiliated with at least one of (i) the prescribed geographical location, or (ii) the first user, is based at least on accessing of a network subscriber database in communication with the network apparatus, wherein the network subscriber database comprises data submitted by the first user, the submitted data indicating at least one of (i) an address of the second user; or (ii) a prescribed familial relationship between the first user and second user.

26. The computerized network apparatus of claim 21, wherein the at least one computer program is further configured to, when executed on the processor apparatus, cause the computerized network apparatus to:
  determine that at least one of the first device or the second device comprises a mobile computerized device; and
  based at least on the determination, cause encapsulation of the first type of event command according to an Internet Protocol.

* * * * *